United States Patent
Umemura

(10) Patent No.: US 11,588,203 B2
(45) Date of Patent: Feb. 21, 2023

(54) NON-AQUEOUS ELECTROLYTE SECONDARY BATTERY

(71) Applicant: TOYOTA JIDOSHA KABUSHIKI KAISHA, Toyota (JP)

(72) Inventor: Kohji Umemura, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 191 days.

(21) Appl. No.: 17/095,912

(22) Filed: Nov. 12, 2020

(65) Prior Publication Data

US 2021/0159474 A1    May 27, 2021

(30) Foreign Application Priority Data

Nov. 27, 2019  (JP) ............... JP2019-214324

(51) Int. Cl.
*H01M 10/0525* (2010.01)
*H01M 50/317* (2021.01)
(Continued)

(52) U.S. Cl.
CPC .......... *H01M 50/317* (2021.01); *H01G 11/14* (2013.01); *H01G 11/58* (2013.01); *H01G 11/78* (2013.01); *H01M 10/0525* (2013.01); *H01M 50/148* (2021.01); *H01M 50/636* (2021.01); *H01M 2200/20* (2013.01)

(58) Field of Classification Search
CPC ........ H01G 11/14; H01G 11/20; H01G 11/58; H01G 11/78; H01G 11/80; H01G 11/82; H01G 9/12; H01M 10/0525; H01M 2200/20; H01M 2220/20; H01M 50/148; H01M 50/15; H01M 50/317; H01M 50/3425; H01M 50/636; H01M 50/655; Y02E 60/10

See application file for complete search history.

(56) References Cited

U.S. PATENT DOCUMENTS

2011/0108134 A1   5/2011  Nishimura et al.
2017/0018748 A1   1/2017  Matsuura
(Continued)

FOREIGN PATENT DOCUMENTS

CN   106356481 A   1/2017
JP   2001-185113 A   7/2001
(Continued)

OTHER PUBLICATIONS

Machine Translation JP2008041548A (Year: 2008).*

*Primary Examiner* — Victoria H Lynch
(74) *Attorney, Agent, or Firm* — Oliff PLC

(57) ABSTRACT

A non-aqueous electrolyte secondary battery including an electrode body having a positive electrode and a negative electrode, a non-aqueous electrolyte, and a battery case is provided. The battery case includes a case body having an opening and configured to house the electrode body and the non-aqueous electrolyte, and a lid configured to close the opening. The lid includes a plate-shaped lid body, a valve portion configured to open when the internal pressure of the battery case is higher than a valve opening pressure determined in advance, and a degassing portion configured to set to be an opening pressure higher than the valve opening pressure of the valve portion.

9 Claims, 6 Drawing Sheets

(51) Int. Cl.
*H01G 11/78* (2013.01)
*H01G 11/14* (2013.01)
*H01G 11/58* (2013.01)
*H01M 50/148* (2021.01)
*H01M 50/636* (2021.01)

(56) References Cited

U.S. PATENT DOCUMENTS

2017/0033342 A1* 2/2017 Ueda ................ H01G 11/12
2020/0194740 A1  6/2020 Mamyoda et al.

FOREIGN PATENT DOCUMENTS

| | | | |
|---|---|---|---|
| JP | 2001-210309 A | 8/2001 | |
| JP | 2008041548 A * | 2/2008 | ............ H01M 10/05 |
| JP | 2008-251438 A | 10/2008 | |
| JP | 2011-108368 A | 6/2011 | |
| JP | 2017-022050 A | 1/2017 | |
| WO | 2015/156276 A1 | 10/2015 | |
| WO | 2019/130501 A1 | 7/2019 | |

* cited by examiner

NON-AQUEOUS ELECTROLYTE SECONDARY BATTERY

CROSS-REFERENCE TO RELATED APPLICATION

This application claims priority to Japanese Patent Application No. 2019-214324 filed on Nov. 27, 2019, incorporated herein by reference in its entirety.

BACKGROUND

1. Technical Field

The present disclosure relates to a non-aqueous electrolyte secondary battery.

2. Description of Related Art

A non-aqueous electrolyte secondary battery such as a lithium-ion secondary battery is widely used as portable power sources such as a personal computer and a mobile terminal, or for power sources for driving vehicles such as an electric vehicle (EV), a hybrid vehicle (HV), and plug-in hybrid vehicle (PHV).

In applications such as power sources for driving vehicles, an assembled battery in which a plurality of non-aqueous electrolyte secondary batteries (single batteries) is electrically connected is widely used for higher output. In an example of the assembled battery, a pair of end plates arranged in a predetermined arrangement direction, a plurality of single batteries arranged between the end plates and having an electrode terminal for external connection, a flat plate-shaped spacer that sandwiches the single batteries from both sides in the arrangement direction, and a restraint mechanism that applies a restraining load between the end plates from the arrangement direction. In the assembled battery, the electrode terminals of the single batteries are electrically connected to each other by a busbar.

SUMMARY

The assembled battery mounted on the vehicle as a power source for driving vehicle is detached from the vehicle and collected from the market when, for example, the vehicle is scrapped or the assembled battery is replaced with a new one. The assembled battery collected from the market often includes a reusable single battery. However, when the single battery is used, gas may be generated inside the single battery due to, for example, temperature deterioration or repeated charging and discharging. As a result, the battery swelling may occur in the single battery, and a side surface in an arrangement direction may bulge in a convex shape. Therefore, when the reusable single batteries are selected from the collected assembled battery and are reassembled as an assembled battery, the positions of the spacers with respect to the single batteries may vary. Thus, it may be difficult to fasten the busbar because, for example, the dimension of the assembled battery is changed due to assemblage of the single batteries in a state of obliquely inclined, or the vertical position of the electrode terminal is shifted. Therefore, when a single battery is reused, one of the issues is to appropriately discharge accumulated gas and reduce the battery swelling.

The present disclosure provides an easily reusable non-aqueous electrolyte secondary battery that can discharge accumulated gas and alleviate the battery swelling.

An aspect of the disclosure relates to a non-aqueous electrolyte secondary battery including an electrode body having a positive electrode and a negative electrode, a non-aqueous electrolyte, and a battery case. The battery case includes a case body having an opening and configured to house the electrode body and the non-aqueous electrolyte, and a lid configured to close the opening. The lid includes a plate-shaped lid body, a valve portion configured to open when the internal pressure of the battery case is higher than a valve opening pressure determined in advance, and a degassing portion configured to be set to an opening pressure higher than the valve opening pressure of the valve portion.

According to the aspect, when the non-aqueous electrolyte secondary battery is reused, the gas accumulated in the non-aqueous electrolyte secondary battery can be discharged by artificially opening the degassing portion. As a result, for example, the battery swelling can be alleviated without opening the valve portion. Therefore, the battery is easy to be reassembled as an assembled battery, and an easily reusable non-aqueous electrolyte secondary battery can be realized. In addition, the function of the valve portion can be maintained even after reuse.

WO 2019/130501 can be cited as a related technical document for discharging the gas accumulated inside the secondary battery. WO 2019/130501 discloses a secondary battery including an exterior member having a flange, and an electrode group arranged inside the exterior member. WO 2019/130501 discloses that, when gas is generated inside the secondary battery, the opening hole in the flange of the exterior member is opened and the generated gas is discharged, and the secondary battery is regenerated.

In the aspect, the lid may further include a welding protrusion provided on a peripheral edge of the degassing portion and configured to fit with a sealing cap. According to the aspect, after the degassing portion is opened and the gas is discharged, the sealing cap and the welding protrusion are welded and joined to each other to easily seal the degassing portion. As a result, the accuracy and reliability of sealing the degassing portion can be improved. Moreover, the convenience in a case of reusing the non-aqueous electrolyte secondary battery can be improved.

In the aspect, the welding protrusion and the degassing portion may be provided in the same member. By providing the welding protrusion and the degassing portion on the same member, the technique disclosed herein can be realized relatively easily.

In the aspect, the degassing portion may be provided in the lid body. According to the aspect, since solely the design of the lid body needs to be changed, the technique disclosed herein can be realized relatively easily.

In the aspect, in the degassing portion, a surface of the lid body facing the case body may be formed in an R-shape (that is, a rounded shape). According to the aspect, for example, when the internal pressure of the non-aqueous electrolyte secondary battery rises due to the gas generated inside the battery case, the stress concentration on the degassing portion can be alleviated. Accordingly, for example, during normal use of the non-aqueous electrolyte secondary battery, the closed state of the degassing portion can be maintained at a high level.

In the aspect, the non-aqueous electrolyte may be a non-aqueous electrolytic solution. The lid may include a liquid injection hole configured to inject the non-aqueous electrolytic solution into the case body, and a liquid injection plug that closes the liquid injection hole. The degassing portion may be provided in the liquid injection plug. According to the aspect, since solely the design of the liquid injection plug needs to be changed, the technique disclosed herein can be realized relatively easily.

In the aspect, the liquid injection plug may have a step portion that protrudes toward the case body, and the degassing portion may be provided at a portion protruding toward the case body, of the step portion. According to the aspect, for example, when the internal pressure of the non-aqueous electrolyte secondary battery rises due to the gas generated inside the battery case, the stress concentration on the degassing portion can be alleviated. Accordingly, for example, during normal use of the non-aqueous electrolyte secondary battery, the closed state of the degassing portion can be maintained at a high level.

In the aspect, the degassing portion may be provided in each of the liquid injection plug and the lid body. According to the aspect, it is easy to further reuse the non-aqueous electrolyte secondary battery once reused. Therefore, the effect of the present disclosure can be exhibited at a higher level.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

Figure 1:
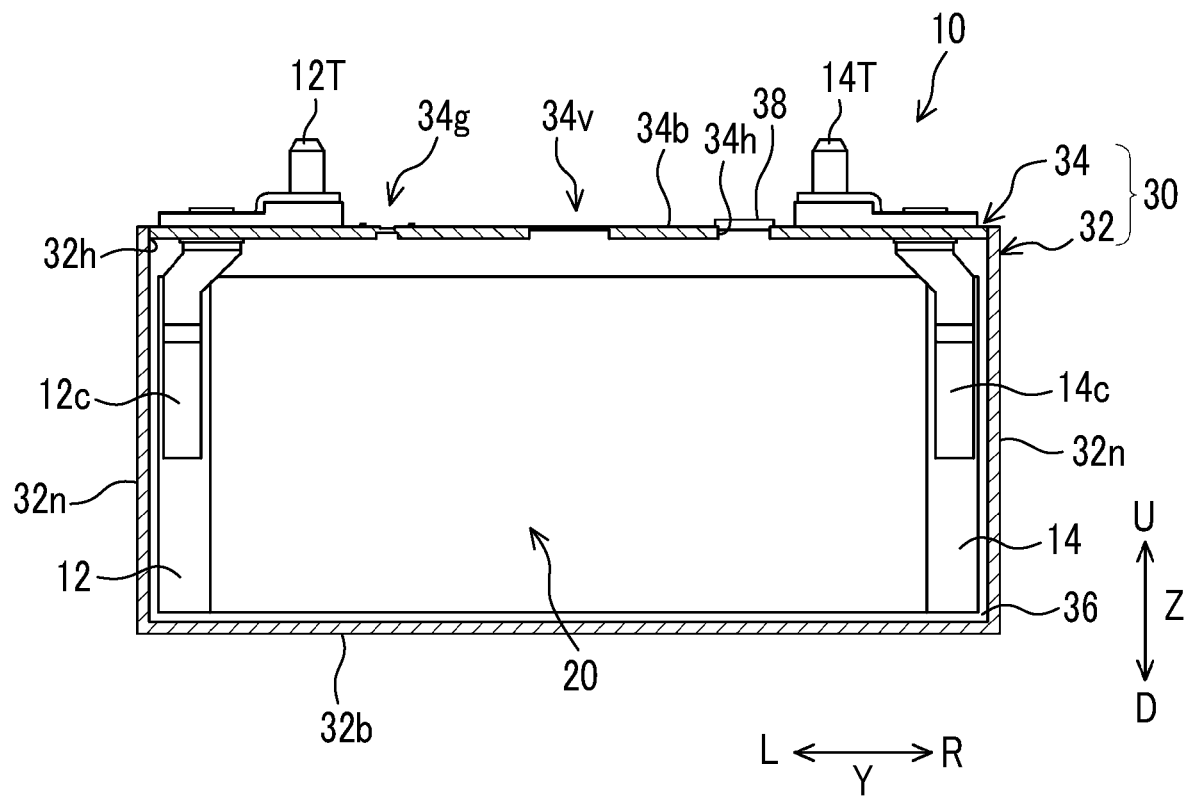
FIG. 1 is a vertical cross-sectional view schematically showing the internal structure of a non-aqueous electrolyte secondary battery according to a first embodiment.

Hereinafter, some suitable embodiments of the technique disclosed herein will be described with reference to the drawings as appropriate. As a matter of course, the embodiments described herein are not intended to limit the technique disclosed herein. Matters other than those specifically mentioned in the present specification, which are needed for carrying out the technique disclosed herein (for example, a general configuration and a manufacturing process of a non-aqueous electrolyte secondary battery and an assembled battery that does not characterize the technique disclosed herein) can be understood as design matters of those skilled in the art based on related techniques in the field. The technique disclosed herein can be carried out based on the contents disclosed in the present specification and common general technical knowledge in the field.

Further, in the following drawings, the same reference numerals are given to the members and portions that the same action can be obtained, and the overlapping description may be omitted or simplified. Reference numerals U, D, F, Rr, R, L in the drawings mean up, down, front, rear, right, left, respectively. Reference numerals X, Y, Z in the drawings mean a front-rear direction, a right-left direction, and an up-down direction, respectively. In the following description, the front-rear direction may be referred to as a thickness direction or an arrangement direction of the non-aqueous electrolyte secondary battery (single battery), and the right-left direction may be referred to as a width direction of the non-aqueous electrolyte secondary battery. Note that, the directions are merely directions for convenience of description, and do not limit installation form of the non-aqueous electrolyte secondary battery at all.

Non-Aqueous Electrolyte Secondary Battery

Figure 2:
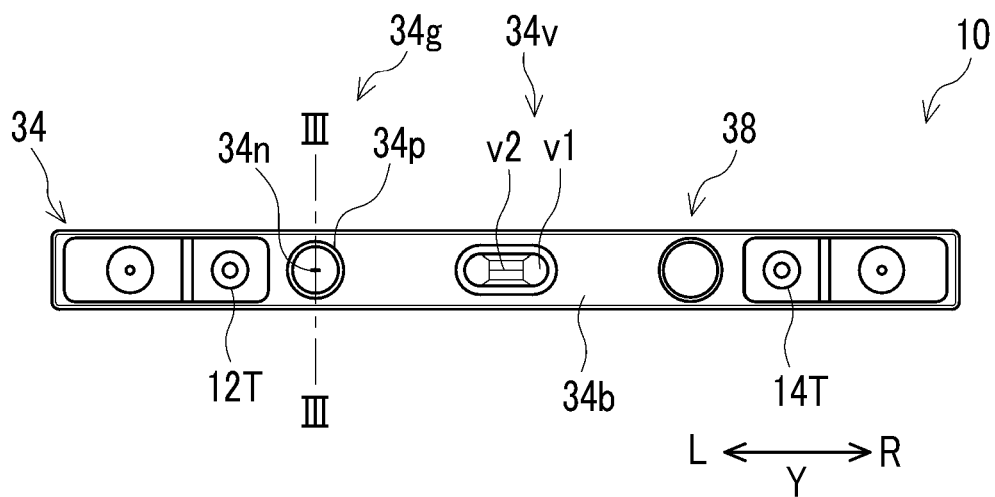
FIG. 2 is a top view schematically showing the non-aqueous electrolyte secondary battery of FIG. 1.

FIG. 1 is a vertical cross-sectional view showing the internal structure of a non-aqueous electrolyte secondary battery 10 according to a first embodiment. FIG. 2 is a top view of the non-aqueous electrolyte secondary battery 10. The non-aqueous electrolyte secondary battery 10 is a rechargeable secondary battery such as a lithium-ion secondary battery, a nickel hydrogen battery, an electric double layer capacitor, or the like. The non-aqueous electrolyte secondary battery 10 includes an electrode body 20, a non-aqueous electrolyte (not shown), and a battery case 30.

The electrode body 20 may be similar to the related technique and is not particularly limited. Here, the electrode body 20 is a wound electrode body in which a belt-shaped positive electrode and a belt-shaped negative electrode are laminated in a state of being insulated by a belt-shaped separator and wound around a winding axis. The wound electrode body has a flat shape that can be housed in the battery case 30. Each of the positive electrode and the negative electrode contains an active material capable of reversibly storing and releasing charge carriers. The positive electrode contains, for example, a lithium transition metal composite oxide as the active material. The negative electrode contains, for example, a carbon material as the active material.

In a cross-sectional view orthogonal to the winding axis, the wound electrode body includes a pair of wound flat portions and a pair of wound R portions interposed between the wound flat portions. In the wound electrode body, a first one of the wound R portions is arranged on the bottom side of the battery case 30, and a second one is arranged on the upper side of the battery case 30. The electrode body 20 is the wound electrode body here, but may be a laminated electrode body in which rectangular positive electrodes and rectangular negative electrodes are alternately laminated in an insulated state.

A positive electrode current collector 12 is provided at a left end of the electrode body 20 in the width direction Y. The positive electrode current collector 12 is provided with a positive electrode current collector plate 12c. The positive electrode of the electrode body 20 is electrically connected to a positive electrode terminal 12T that will be described later, via the positive electrode current collector plate 12c. Further, a negative electrode current collector 14 is provided at a right end of the electrode body 20 in the width direction Y. The negative electrode current collector 14 is provided with a negative electrode current collector plate 14c. The negative electrode of the electrode body 20 is electrically connected to a negative electrode terminal 14T that will be described later, via the negative electrode current collector plate 14c.

The non-aqueous electrolyte may be similar to the related technique and is not particularly limited. The non-aqueous electrolyte here is a liquid non-aqueous electrolytic solution at room temperature (25° C.). The non-aqueous electrolytic solution may contain a non-aqueous solvent and a supporting salt. The non-aqueous solvent may be, for example, an organic solvent such as carbonate. The supporting salt may be, for example, a lithium salt containing lithium ions as charge carriers. The non-aqueous electrolyte may be a liquid or polymeric (gel) non-aqueous electrolyte within an operating temperature range of the non-aqueous electrolyte secondary battery 10, for example, within a temperature range from −20 to +60° C. Note that, the non-aqueous electrolyte may be a solid non-aqueous electrolyte at room temperature (25° C.). The non-aqueous electrolyte may be, for example, a solid electrolyte layer interposed between the positive electrode and the negative electrode.

The battery case 30 is a housing that houses the electrode body 20 and the non-aqueous electrolyte. The battery case 30 has a flat rectangular (cuboid) outer shape here. Note that, the outer shape of the battery case 30 may be other shapes such as a cubic shape and a cylindrical shape. The battery case 30 includes a case body 32 having an opening 32h and a lid (sealing plate) 34 that closes the opening 32h. The battery case 30 is integrated by joining (for example, weld-joining) the lid 34 to the peripheral edge of the opening 32h of the case body 32. The battery case 30 is airtightly (hermetically) sealed.

The case body 32 is a bottomed box type having the opening 32h at the upper side. The case body 32 has a housing space 36 that houses the electrode body 20 and the non-aqueous electrolyte. The case body 32 includes a bottom surface 32b opposite to the lid 34, a pair of short side surfaces 32n and a pair of long side surfaces (not shown) as side surfaces, that are continuous from the bottom surface 32b. Bottom surface 32b faces the first one of the wound R portions of the electrode body 20. The long side surfaces face the wound flat portions of the electrode body 20. Each of the short side surfaces 32n and the long side surfaces is formed flat. The case body 32 is formed, for example, from a single metal plate by drawing.

The case body 32 is made of, for example, a soft metal mainly containing one of aluminum, copper, magnesium, and brass (occupy 50% by mass or more). Among these, a lightweight metal such as aluminum or aluminum alloy is preferable. From the viewpoint of cost reduction and weight reduction, the thickness (plate thickness) of the case body 32 may be approximately 1 mm or less, typically 0.5 mm or less, for example, 0.3 mm to 0.5 mm. The battery case 30 made of soft metal and/or thin battery case 30 as described above is easily deformed by internal pressure. The battery swelling is likely to occur in the easily deformable battery case 30. Therefore, a high effect can be obtained by applying the technique disclosed herein.

The lid 34 is attached to the peripheral edge of the opening 32h of the case body 32. As shown in FIG. 1 and FIG. 2, the lid 34 includes a lid body 34b, the positive electrode terminal 12T, the negative electrode terminal 14T, a liquid injection plug 38, a valve portion (pressure release valve) 34v, and a degassing mechanism 34g. Note that, the liquid injection plug 38 is not essential and may be omitted, for example, when the non-aqueous electrolyte is solid. The lid body 34b is a rectangular plate-shaped member. The lid body 34b extends in the width direction Y. The lid body 34b has a flat plate portion having a thickness La (refer to FIG. 3). The lid body 34b is made of, for example, the metal same as or different from the case body 32.

The positive electrode terminal 12T is provided at a left end of the lid body 34b in the width direction Y. The positive electrode terminal 12T is electrically connected to the positive electrode of the electrode body 20. The negative electrode terminal 14T is provided at a right end of the lid body 34b in the width direction Y. The negative electrode terminal 14T is electrically connected to the negative electrode of the electrode body 20.

As shown in FIG. 1, the lid body 34b is provided with a liquid injection hole 34h. The liquid injection hole 34h is a through-hole passing through the lid body 34b in the thickness direction (the up-down direction in FIG. 1). The liquid injection hole 34h is for injecting the non-aqueous electrolytic solution into the inside of the case body 32, that is, the housing space 36. The liquid injection hole 34h is used, for example, when the non-aqueous electrolyte secondary battery 10 is constructed or when the non-aqueous electrolyte secondary battery 10 is reused. The liquid injection hole 34h is provided between the positive electrode terminal 12T and the negative electrode terminal 14T in the width direction Y. After the non-aqueous electrolytic solution is injected, a liquid injection plug 38 is attached to the liquid injection hole 34h. The liquid injection plug 38 is made of metal such as aluminum or stainless steel. As a result, the liquid injection plug 38 is integrated with the lid body 34b, and the liquid injection hole 34h is airtightly (hermetically) sealed.

The valve portion 34v is a so-called safety valve. The valve portion 34v is provided between the positive electrode terminal 12T and the negative electrode terminal 14T in the width direction Y. Specifically, the valve portion 34v is provided between the degassing mechanism 34g and the liquid injection plug 38 in the width direction Y. The valve portion 34v is configured to be in the open state in which the inside and outside of the battery case 30 communicate with each other, when the internal pressure of the housing space 36 is higher than a valve opening pressure determined in advance during normal use of the non-aqueous electrolyte secondary battery 10. When the valve portion 34v is in the open state, the gas accumulated in the housing space 36 is released to the outside of the non-aqueous electrolyte secondary battery 10 and the internal pressure of the non-aqueous electrolyte secondary battery 10 is released. The valve opening pressure of the valve portion 34v may be approximately from 0.1 MPa to 1.0 MPa, for example from 0.3 MPa to 0.5 MPa.

The valve portion 34v is formed to be thinner than the thickness La (refer to FIG. 3) of the lid body 34b. As shown in FIG. 2, the valve portion 34v is mainly configured by a metal (for example, aluminum) sheet v1 attached to the lid body 34b here. Note that, the valve portion 34v may be integrally formed with the lid body 34b and may form a part of the lid body 34b. The valve portion 34v may be a partly thin portion of the lid body 34b.

The valve portion 34v of the present embodiment has a non-linear cut groove v2 provided in the metal sheet v1. The cut groove v2 has a shape in which the lower ends of two Y-shapes face each other. Note that, the cut groove v2 may be linear, and non-linear other than Y-shaped, for example, curved shaped (for example, semicircular, C-shaped, U-shaped, or S-shaped), polygonal line-shaped (for example, L-shaped, or N-shaped), linear intersecting with each other (for example, radial-shaped, or a cross-shaped), linear having a branch (for example, H-shaped). When the internal pressure of the non-aqueous electrolyte secondary battery 10 exceeds the valve opening pressure, the cut groove v2 receives the internal pressure and is cleaved. As a result, the metal sheet v1 is typically extruded away from the case body 32 (the upper side in FIG. 1).

Figure 3:
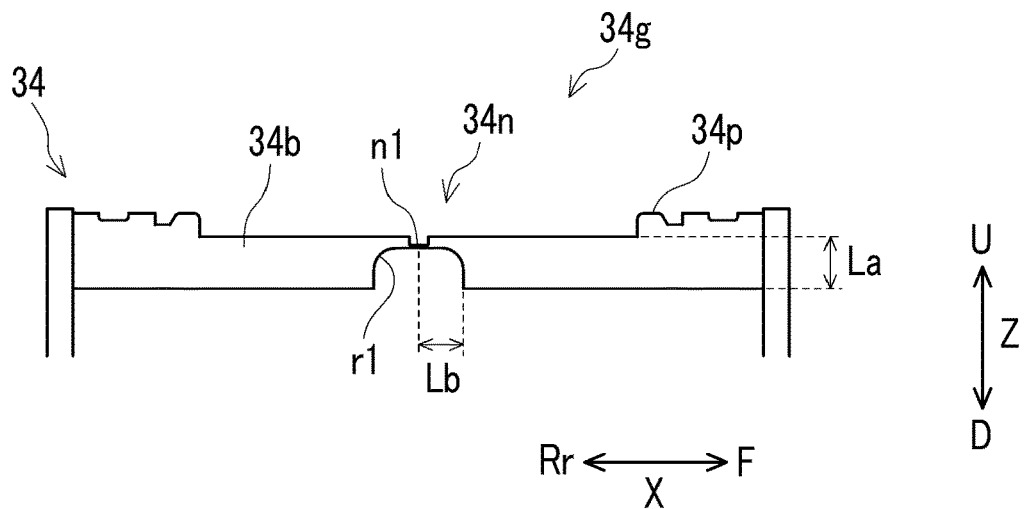
FIG. 3 is a cross-sectional view taken along line of FIG. 2.

FIG. 3 is a cross-sectional view of the degassing mechanism 34g viewed from the thickness direction X. Here, the degassing mechanism 34g is integrally formed with the lid body 34b and forms a part of the lid body 34b. As shown in FIG. 2, the degassing mechanism 34g is provided between the positive electrode terminal 12T and the negative electrode terminal 14T in the width direction Y. Specifically, the degassing mechanism 34g is provided between the positive electrode terminal 12T and the valve portion 34v in the width direction Y. The degassing mechanism 34g is used when the non-aqueous electrolyte secondary battery 10 is reused. As shown in FIG. 2 and FIG. 3, the degassing mechanism 34g includes a degassing portion 34n and a welding protrusion 34p. Note that, the welding protrusion 34p is not essential and may be omitted.

The degassing portion 34n is a planned opening portion that is in the open state in which the inside and outside of the battery case 30 communicate with each other by artificially applying an external force when the non-aqueous electrolyte secondary battery 10 is reused. The degassing portion 34n is configured to forcibly release the gas accumulated in the housing space 36 to the outside of the non-aqueous electrolyte secondary battery 10 to eliminate or alleviate the battery swelling. The degassing portion 34n is relatively thin compared to a portion other than the degassing portion 34n of the lid body 34b, for example, the flat plate portion having the thickness La such that passing through in the thickness direction (the up-down direction in FIG. 1) is easy. By using the degassing portion 34n, the non-aqueous electrolyte secondary battery 10 can be easily in the open state when the non-aqueous electrolyte secondary battery 10 is reused.

The degassing portion 34n is set to an opening pressure higher than the valve opening pressure of the valve portion 34v. Therefore, the degassing portion 34n is typically configured to maintain the closed state even when the valve portion 34v is in the open state. The degassing portion 34n is typically configured to maintain the closed state during normal use of the non-aqueous electrolyte secondary battery 10. From the described above, in a cross-sectional view, the minimum thickness (typically the length of the up-down direction) of the degassing portion 34n may be larger than the valve portion 34v.

As shown in FIG. 3, the degassing portion 34n herein is provided continuously from the lid body 34b. The degassing portion 34n include groove portion (notch) n1 provided on the outer surface (the upper surface in FIG. 3) of the lid body 34b and an R portion r1 provided on the inner surface (the lower surface in FIG. 3) of the lid body 34b, that is, a surface that faces the case body 32.

The groove portion n1 is typically a portion into which a sharp member is inserted when the non-aqueous electrolyte secondary battery 10 is reused. Since the groove portion n1 is provided on the outer surface of the lid body 34b, the groove portion n1 also functions as a guide for indicating the position of the degassing portion 34n. The groove portion n1 herein has a cross-sectional U-shape. In the cross-sectional view, the maximum depth (the length of the up-down direction in FIG. 3) of the groove portion n1 herein is smaller than the maximum height (the length of the up-down direction in FIG. 3) of welding protrusion 34p. As shown in FIG. 2, in a plan view, the groove portion n1 herein has a linear shape extending in the width direction Y. Note that, the groove portion n1 may be dot-shaped or non-linear. The groove portion n1 herein is shorter in length than the liquid injection hole 34h in the width direction Y. The groove portion n1 herein is shorter in length than the cut groove v2 of the valve portion 34v in the width direction Y.

The R portion r1 is larger in area than the groove portion n1 in the plan view. The R portion r1 is provided to surround the groove portion n1 in an annular shape with the groove portion n1 as the center. As shown in FIG. 3, the length of the R portion r1 herein is longer in length than the groove portion n1 in the thickness direction X. Although not shown, the R portion r1 herein is longer in length than the groove portion n1 in the width direction Y. Thereby, for example, during normal use of the non-aqueous electrolyte secondary battery 10, even though the internal pressure of the non-aqueous electrolyte secondary battery 10 rises, the stress concentration on the groove portion n1 can be alleviated. A dome-shaped space is maintained between the groove portion n1 and the housing space 36. A curvature radius Lb of the R portion r1 is equal to or smaller than the thickness La of the lid body 34b. When the non-aqueous electrolyte secondary battery 10 is reused, the peripheral edge portion of the groove portion n1 of the lid body 34b is pushed into the case body 32 side (the lower side in FIG. 3), when a sharp member is inserted into the groove portion n1. At the time, when the dome-shaped space is maintained, the lid body 34b pushed into the case body 32 side is less likely to interfere with the electrode body 20 housed in the case body 32. Further, by setting the curvature radius Lb≤the thickness La, the portion of the lid body 34b pushed into the case body 32 side can be suppressed to small.

The welding protrusion 34p is used when the degassing portion 34n that has been once opened is brought to the closed again, when the non-aqueous electrolyte secondary battery 10 is reused. As shown in FIG. 3, the welding protrusion 34p protrudes toward the side away from the battery case 30 (the upper side in FIG. 3). The welding protrusion 34p is formed by molding the portion to be thicker than the thickness La of the lid body 34b, for example, by uplifting the peripheral edge of the degassing portion 34n in the lid body 34b. In the cross-sectional view, the maximum height (the length of the up-down direction in FIG. 3) of welding protrusion 34p herein is greater than the maximum depth (the length of the up-down direction in FIG. 3) of the groove portion n1.

As shown in FIG. 2, the welding protrusion 34p is provided to surround the degassing portion 34n. Here, the welding protrusion 34p is continuously provided to surround the degassing portion 34n in an annular shape. Note that, the welding protrusions 34p may be provided in the shape of a plurality of islands at intervals to surround the degassing portion 34n. In addition, in the plan view, the welding protrusion 34p may have a shape other than an annular shape, for example, a polygonal frame shape.

The welding protrusion 34p is configured such that a sealing cap S (refer to FIG. 5B) can be fitted therein when the non-aqueous electrolyte secondary battery 10 is reused. The welding protrusion 34p also functions as a guide indicating a position where the sealing cap S is fitted. By fitting the sealing cap S along the inner edge of the welding protrusion 34p, the welding protrusion 34p and the sealing cap S are flush with each other. In the state, the degassing portion 34n is airtightly sealed by welding and joining the welding protrusion 34p and the sealing cap S. As a result, the degassing portion 34n that is in the open state can be easily resealed. Therefore, the accuracy and reliability of sealing the degassing portion 34n can be improved.

The non-aqueous electrolyte secondary battery 10 configured as described above can be used for various applications. The non-aqueous electrolyte secondary battery 10 is typically in the form of an assembled battery 1 in which a plurality of non-aqueous electrolyte secondary batteries 10 is electrically connected, and is suitably used as a power source (power source for driving) for a motor mounted on a vehicle. The type of vehicle is not particularly limited, but typically an automobile, for example, a plug-in hybrid vehicle (PHV), a hybrid vehicle (HV), an electric vehicle (EV).

Assembled Battery

Figure 4:
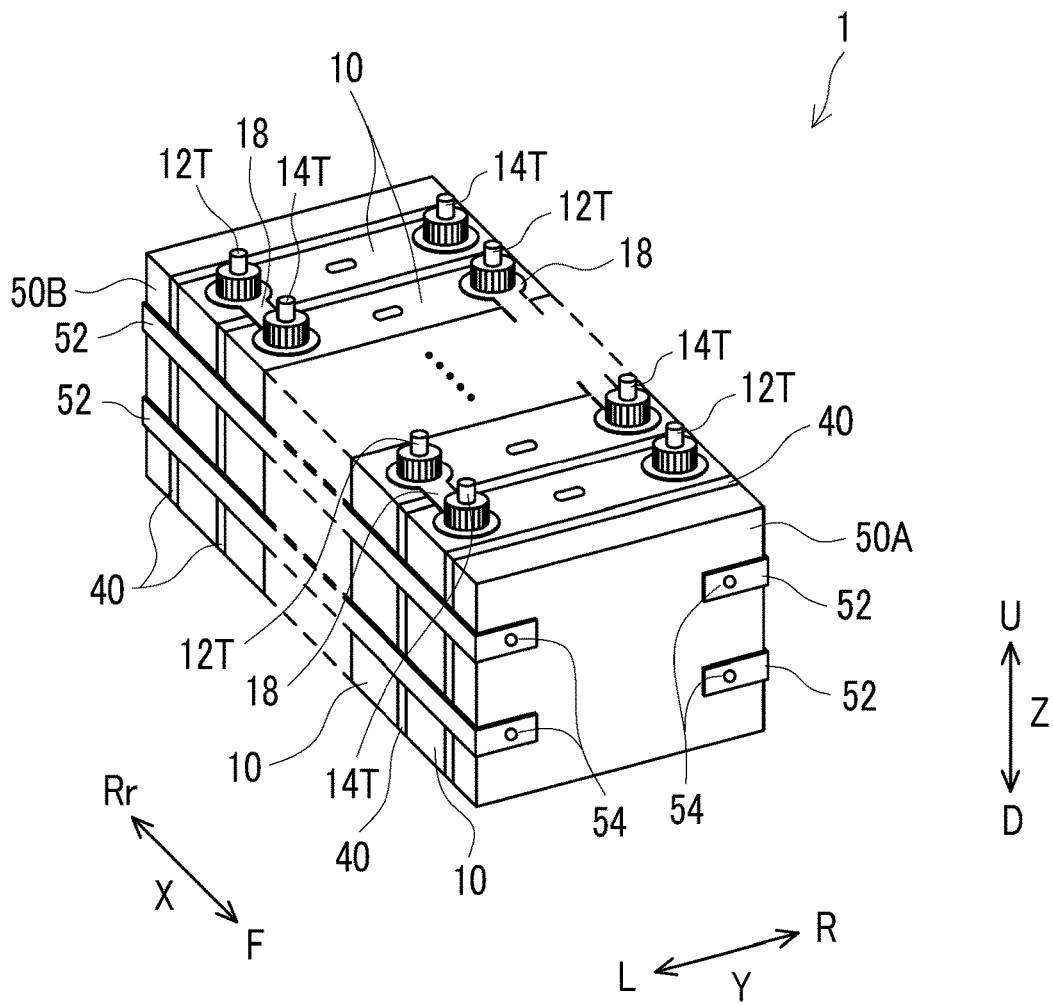
FIG. 4 is a perspective view schematically showing an assembled battery according to the first embodiment.

FIG. 4 is a perspective view of the assembled battery 1. The assembled battery 1 includes the non-aqueous electrolyte secondary batteries (single batteries) 10, a plurality of spacers 40, a pair of end plates 50A, 50B, and a plurality of restraint bands 52. Note that, the spacers 40, the end plates 50A, 50B, and the restraint bands 52 are not essential, and some or all of the spacers 40, the end plates 50A, 50B, and the restraint bands 52 can be omitted. Further, the shape, size, number, arrangement, connection method, and the like of the single batteries 10 constituting the assembled battery 1 are not limited to the aspect disclosed herein, and can be changed as appropriate.

The single batteries 10 are arranged in the arrangement direction X in a state where the single batteries are inverted alternately such that the positions of the positive electrode terminals 12T and the negative electrode terminals 14T are alternated. In the assembled battery 1, the positive electrode terminal 12T and the negative electrode terminal 14T of the adjacent single batteries 10 are electrically connected by the busbar 18. As described above, the assembled battery 1 is electrically connected in series. The single batteries 10 have a pair of long side surfaces faces the spacers 40, respectively.

The spacer 40 is a heat dissipation member that dissipates the heat generated in the single battery 10. The spacers 40 are arranged between the single batteries 10 and between the single battery 10 and each of the end plates 50A, 50B in the arrangement direction X. The spacers 40 sandwich the single battery 10 from both sides in the arrangement direction X. The spacer 40 is a plate-shaped member. The spacer 40 is made of, for example, a resin such as polypropylene (PP) or polyphenylene sulfide (PPS), or made of metal having good thermal conductivity.

End plates 50A, 50B are arranged at both ends of the assembled battery 1, in the arrangement direction X (the front-rear direction in FIG. 4) of the single battery 10. The end plates 50A, 50B sandwich the single batteries 10 and the spacers 40 in the arrangement direction X. The restraint bands 52 are attached to bridge the end plates 50A, 50B. The restraint bands 52 are fixed to the end plates 50A, 50B by a plurality of screws 54. Each of the restraint bands 52 is attached such that a predetermined restraining pressure is applied in the arrangement direction X. As described above, the restraining load is applied to the single batteries 10 and the spacers 40 from the arrangement direction X such that the assembled battery 1 is held integrally. In the present embodiment, a restraint mechanism is constituted of the end plates 50A, 50B, the restraint bands 52, and the screws 54. Note that, the restraint mechanism is not limited to the description.

As described above, in the non-aqueous electrolyte secondary battery 10 of the first embodiment, the lid 34 (specifically, the lid body 34b) is provided with the degassing portion 34n. As described above, when the non-aqueous electrolyte secondary battery 10 is reused, the operator can easily open the degassing portion 34n and discharge the gas accumulated inside the case body 32 (that is, the housing space 36). As a result, for example, the battery swelling can be alleviated without opening the valve portion 34v. Therefore, the easily reusable non-aqueous electrolyte secondary battery that is easy to be the assembled battery 1 again can be realized. Further, the function of the valve portion 34v is not impaired during reuse, and the function can be maintained after reuse.

Method of Manufacturing Assembled Battery

The assembled battery collected from the market often includes a reusable single battery (the non-aqueous electrolyte secondary battery 10). In the following description, the method of manufacturing the assembled battery 1 by reusing the non-aqueous electrolyte secondary battery 10 collected from the market (reuse) is described. The manufacturing method includes, for example, the following four steps: a selecting step of selecting the reusable non-aqueous electrolyte secondary battery 10; a degassing step of degassing the internal gas by opening the degassing portion 34n of the non-aqueous electrolyte secondary battery 10 selected in the selecting step; a resealing step of resealing the non-aqueous electrolyte secondary battery 10 by closing the degassing portion 34n opened in the degassing step; and an assembled battery constructing step of constructing the assembled battery 1 using the resealed non-aqueous electrolyte secondary battery 10. Among these, the degassing step and the resealing step can be understood as a method of reusing the non-aqueous electrolyte secondary battery 10. In addition, the manufacturing method disclosed herein may appropriately include other steps in addition to the above steps. For example, a replenishing step of adding a non-aqueous electrolyte to the non-aqueous electrolyte secondary battery 10 may be included between the selecting step and the assembled battery constructing step.

In the selecting step, first, the non-aqueous electrolyte secondary battery 10 collected from the market is prepared. Next, the operator checks, for example, the battery characteristics of the non-aqueous electrolyte secondary battery 10 with a predetermined test method (for example, a charge and discharge test). Then, the non-aqueous electrolyte secondary battery 10 having a battery characteristic equal to or greater than a predetermined threshold value is selected. In a preferred aspect, the operator further determines whether or not the battery swelling occurs in the non-aqueous electrolyte secondary battery 10 with a predetermined test method (for example, measurement of the dimension of the battery case 30). Then, the non-aqueous electrolyte secondary battery 10 in which the battery swelling is equal to or greater than a predetermined threshold value is selected as "a battery with battery swelling".

In the degassing step, first, the operator applies an external force to the degassing portion 34n of the non-aqueous electrolyte secondary battery 10 selected in the selecting step. As an example, a sharp member is inserted into the groove portion n1 of the degassing portion 34n, and the sharp member is passed through the degassing portion 34n. As a result, the degassing portion 34n is in the open state. The step may be performed, for example, solely for the non-aqueous electrolyte secondary battery 10 that is selected as "a battery with battery swelling" in the selecting step. Further, the step is preferably performed in a dry environment (for example, an environment having a dew-point temperature of −50° C. or lower).

Figure 5A:
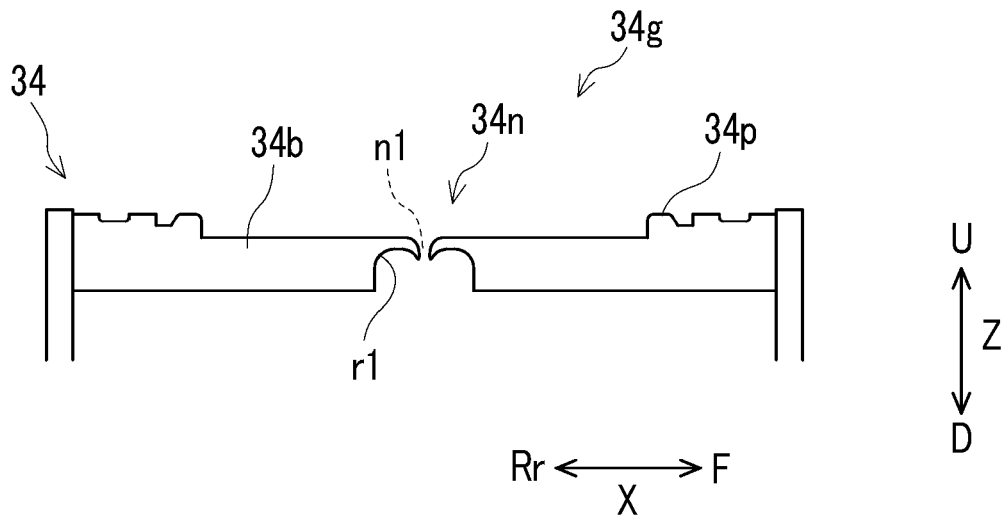
FIG. 5A is a cross-sectional view schematically showing a state in which a degassing portion is opened.

FIG. 5A is a cross-sectional view of the degassing portion 34n in the open state viewed from the thickness direction X.

In the non-aqueous electrolyte secondary battery 10, the groove portion n1 is broken, and the peripheral edge portion of the groove portion n1 of the lid body 34b is pushed into the case body 32 (the lower side in FIG. 5A). The gas accumulated in the battery case 30 is forcibly released to the outside by opening the degassing portion 34n. In an aspect, a suction device of the related technique may be attached to the degassing portion 34n in the open state, to forcibly suck the fluid in the battery case 30. As a result, the battery swelling of the non-aqueous electrolyte secondary battery 10 can be eliminated.

In the resealing step, first, the sealing cap S (refer to FIG. 5B) is prepared. The sealing cap S is typically a plate-shaped member. The outer shape of the sealing cap S is equal to or smaller than the area surrounded by the welding protrusion 34p. The sealing cap S herein is a disk-shaped member. The thickness of the sealing cap S is equal to the maximum height of welding protrusion 34p (the length of the up-down direction in FIG. 5B). Next, the operator fits the sealing cap S along the inner edge of the welding protrusion 34p onto the non-aqueous electrolyte secondary battery 10 that has been the open state in the degassing step. As a result, the welding protrusion 34p and the sealing cap S are flush with each other. Next, the operator welds and joins the entire periphery of the sealing cap S to the welding protrusion 34p. The method of weld-joining is not particularly limited, but examples of the method include laser welding.

Figure 5B:
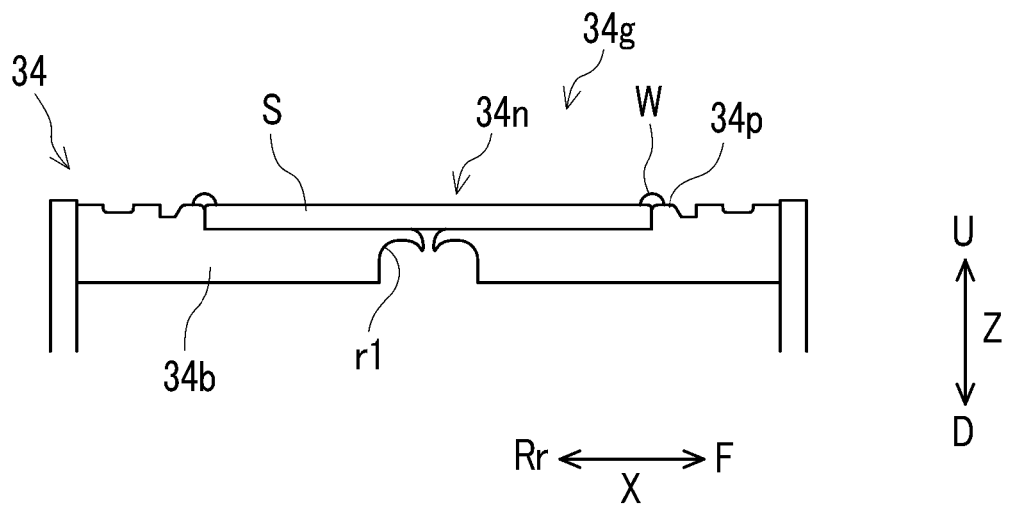
FIG. 5B is a cross-sectional view schematically showing a state in which the degassing portion is resealed.

FIG. 5B is a cross-sectional view of the degassing portion 34n in the resealed state viewed from the thickness direction X. In the non-aqueous electrolyte secondary battery 10, the welded joint W is formed over the entire periphery of the sealing cap S, and the degassing portion 34n is airtightly sealed. As a result, the degassing portion 34n that is in the open state in the degassing step can be easily resealed.

In the assembled battery constructing step, first, the non-aqueous electrolyte secondary battery (single battery) 10 and the spacer 40 are alternately arranged in a predetermined direction by the operator. Next, the single battery 10 and the spacer 40 are restrained by the restraint mechanism. In an example, the single battery 10 and the spacer 40 are arranged between the end plates 50A, 50B, and the restraint bands 52 bridge over the end plates 50A, 50B such that the predetermined restraining load is applied. The assembled battery 1 can be manufactured as described above.

Second Embodiment

Figure 6:
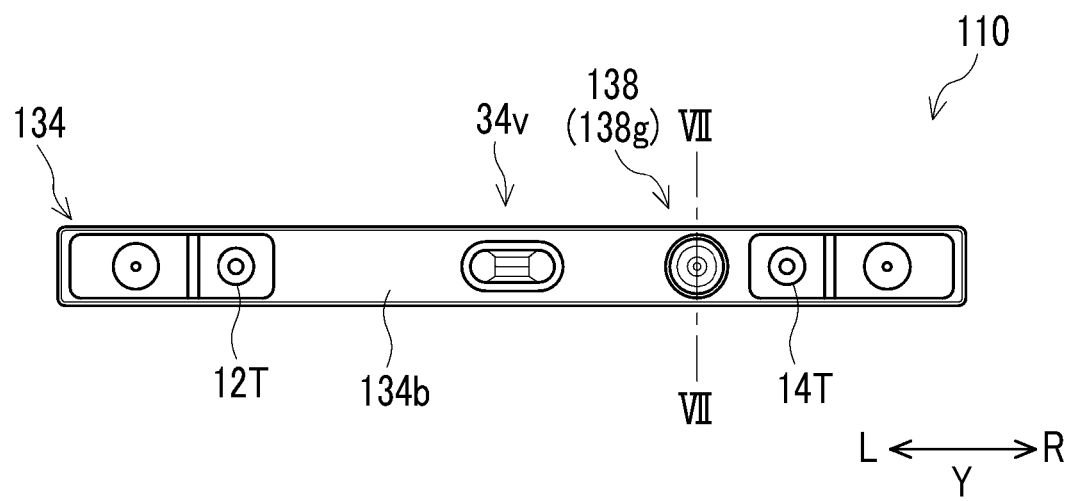
FIG. 6 is a top view schematically showing a non-aqueous electrolyte secondary battery according to a second embodiment.

FIG. 6 is a top view of a non-aqueous electrolyte secondary battery 110 according to the second embodiment. In FIG. 6, the same reference numerals are given to the same members as those in the first embodiment. The non-aqueous electrolyte secondary battery 110 includes a lid 134 instead of the lid 34. The non-aqueous electrolyte secondary battery 110 is the same as that of the first embodiment, except that the degassing mechanism is provided in the liquid injection plug instead of the lid body. Therefore, the description of the portions common to the first embodiment will be omitted or simplified.

As shown in FIG. 6, the lid 134 includes a lid body 134b, the positive electrode terminal 12T, the negative electrode terminal 14T, a liquid injection plug 138, and the valve portion (pressure release valve) 34v. The positive electrode terminal 12T, the negative electrode terminal 14T, and the valve portion 34v may be the same as in the first embodiment. Unlike the first embodiment, the lid body 134b does not have a degassing mechanism. The lid body 134b is provided with an annular liquid injection hole 134h (refer to FIG. 7). The liquid injection hole 134h is airtightly (hermetically) sealed with a liquid injection plug 138 that is attached to the liquid injection hole 134h. The liquid injection plug 138 herein is a substantially disk-shaped member. The liquid injection plug 138 is made of metal such as aluminum or stainless steel.

Figure 7:
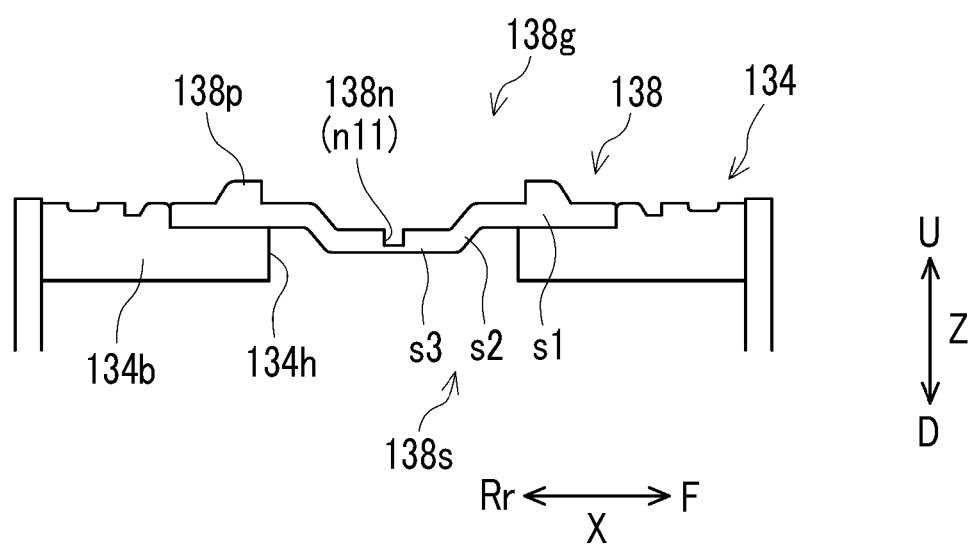
FIG. 7 is a cross-sectional view taken along line VII-VII of FIG. 6.

FIG. 7 is a cross-sectional view of the liquid injection plug 138 viewed from the thickness direction X. The liquid injection plug 138 is provided with a degassing mechanism 138g. The degassing mechanism 138g includes a degassing portion 138n and a welding protrusion 138p. Note that, the welding protrusion 138p is not essential and may be omitted. The liquid injection plug 138 includes an outer edge portion s1, an inclined portion s2, and a central portion s3.

The outer edge portion s1 extends along the outer surface (the upper surface in FIG. 7) of the lid body 134b. The outer edge portion s1 extends in an annular shape along an XY plane. The outer edge portion s1 is arranged at a position farther from the case body 32 (the upper side in FIG. 7) than the inclined portion s2 and the central portion s3. A welding protrusion 138p is provided on the outer surface of the outer edge portion s1 (the upper surface in FIG. 7). The shape, size, configuration, or the like of the welding protrusion 138p may be the same as the welding protrusion 34p of the first embodiment. The inclined portion s2 connects the outer edge portion s1 and the central portion s3. The inclined portion s2 is continuous from an end on a side closer to the center of the outer edge portion s1. The inclined portion s2 extends obliquely from the outer edge portion s1 toward the case body 32 side (the lower side in FIG. 7).

The central portion s3 is continuous from a lower end of the inclined portion s2. The central portion s3 extends parallel to the outer edge portion s1. The central portion s3 extends in a circular shape along the XY plane of FIG. 7. The central portion s3 is provided with the degassing portion 138n. The degassing portion 138n herein is constituted by a groove portion (notch) n11. The shape, size, configuration, or the like of the groove portion n11 may be the same as the groove portion n1 of the first embodiment. The inclined portion s2 and the central portion s3 constitute a step portion 138s. The step portion 138s is recessed toward the case body 32 side (the lower side in FIG. 7) than the outer edge portion s1. The step portion 138s protrudes toward the case body 32 side (the lower side in FIG. 7).

Figure 8A:
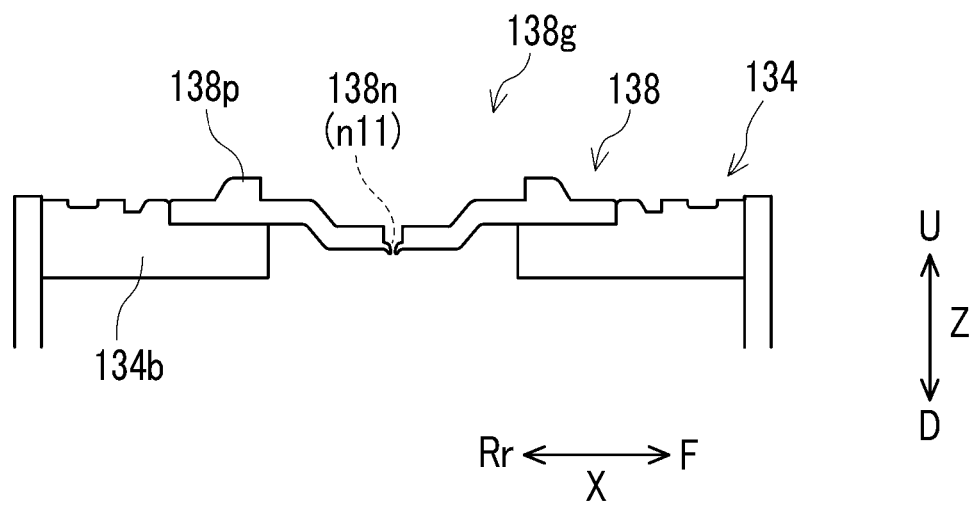
FIG. 8A is a cross-sectional view schematically showing a state in which a degassing portion is opened.
Figure 8B:
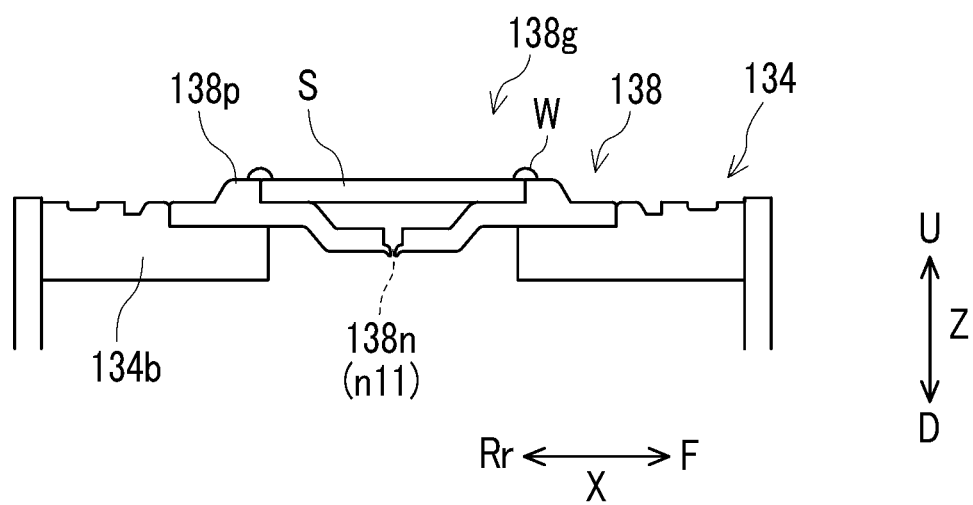
FIG. 8B is a cross-sectional view schematically showing a state in which the degassing portion is resealed.

When the non-aqueous electrolyte secondary battery 110 having the above-described configuration is collected from the market and reused in the assembled battery 1, the operator applies an external force to the degassing portion 138n in the degassing step. FIG. 8A is a cross-sectional view of the degassing portion 138n in the open state viewed from the thickness direction X. In the non-aqueous electrolyte secondary battery 110, the groove portion n11 is broken and the degassing portion 138n is opened. In the resealing step, the operator fits the sealing cap S (refer to FIG. 8B) along the inner edge of the welding protrusion 138p. Then, the operator welds and joins the entire periphery of the sealing cap S to the welding protrusion 138p. FIG. 8B is a cross-sectional view of the degassing portion 138n in the resealed state viewed from the thickness direction X. In the non-aqueous electrolyte secondary battery 110, the welded joint W is formed over the entire periphery of the sealing cap S, and the degassing portion 138n is airtightly sealed.

Although the present disclosure has been described in detail above, the embodiments are merely examples, and the present disclosure disclosed herein includes various modifications and changes of the above-described specific examples.

Figure 9:
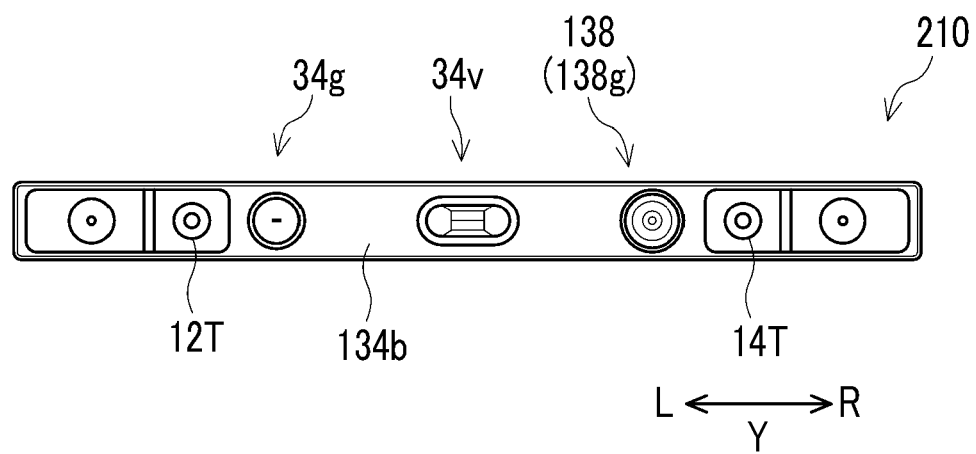
FIG. 9 is a top view schematically showing a non-aqueous electrolyte secondary battery according to a third embodiment.

For example, in the first embodiment, the lid body 34b is provided with one degassing mechanism 34g. In addition, in the second embodiment, the liquid injection plug 138 is provided with one degassing mechanism 138g. However, the present disclosure is not limited to the description. A plurality of degassing mechanisms may be provided for one non-aqueous electrolyte secondary battery 10, 110. For example, two or more degassing mechanisms 34g may be provided in the lid body 34b of the first embodiment. Alternatively, the degassing mechanism 34g may be provided in the lid body 134b of the second embodiment. That is, as a non-aqueous electrolyte secondary battery 210 shown in FIG. 9, the lid body 134b may be provided with the degassing mechanism 34g, and also the liquid injection plug 138 may be provided with the degassing mechanism 138g. By providing the lid with a plurality of degassing mechanisms, the non-aqueous electrolyte secondary battery once reused is easy to be further reused.

What is claimed is:

1. A reusable non-aqueous electrolyte secondary battery comprising:
    an electrode body having a positive electrode and a negative electrode;
    a non-aqueous electrolyte; and
    a battery case,
    wherein the battery case includes:
        a case body having an opening and configured to house the electrode body and the non-aqueous electrolyte, and
        a lid configured to close the opening, and
    the lid includes:
        a plate-shaped lid body,
        a valve portion configured to open when an internal pressure of the battery case is higher than a valve opening pressure determined in advance,
        a degassing portion configured to be set to an opening pressure higher than the valve opening pressure of the valve portion,
        in a state of reuse of the reusable non-aqueous electrolyte secondary battery, a sealing cap configured to seal the degassing portion, and
        a welding protrusion provided on a peripheral edge of the degassing portion and configured to fit with the sealing cap.

2. The reusable non-aqueous electrolyte secondary battery according to claim 1, wherein the welding protrusion and the degassing portion are provided in a same member.

3. The reusable non-aqueous electrolyte secondary battery according to claim 1, wherein the degassing portion is provided in the lid body.

4. The reusable non-aqueous electrolyte secondary battery according to claim 3, wherein in the degassing portion, a surface of the lid body facing the case body is formed in an R-shape.

5. The reusable non-aqueous electrolyte secondary battery according to claim 1, wherein the non-aqueous electrolyte is a non-aqueous electrolytic solution,
    the lid further includes:
        a liquid injection hole configured to inject the non-aqueous electrolytic solution into the case body, and
        a liquid injection plug that closes the liquid injection hole, and
    the degassing portion is provided in the liquid injection plug.

6. The reusable non-aqueous electrolyte secondary battery according to claim 5, wherein the liquid injection plug has a step portion that protrudes toward the case body, and
    the degassing portion is provided at a portion protruding toward the case body, of the step portion.

7. The reusable non-aqueous electrolyte secondary battery according to claim 5, wherein the degassing portion is provided in each of the liquid injection plug and the lid body.

8. The reusable non-aqueous electrolyte secondary battery according to claim 1, wherein the state of reuse is a state in which the reusable non-aqueous electrolyte secondary battery has been degassed at least once.

9. A reused non-aqueous electrolyte secondary battery comprising:
    an electrode body having a positive electrode and a negative electrode;
    a non-aqueous electrolyte; and
    a battery case,
    wherein the battery case includes:
        a case body having an opening and configured to house the electrode body and the non-aqueous electrolyte, and
        a lid configured to close the opening,
    the lid includes:
        a plate-shaped lid body,
        a valve portion configured to open when an internal pressure of the battery case is higher than a valve opening pressure determined in advance,
        a degassing portion configured to be set to an opening pressure higher than the valve opening pressure of the valve portion,
        a sealing cap configured to seal the degassing portion, and
        a welding protrusion provided on a peripheral edge of the degassing portion and configured to fit with the sealing cap, and
    the reused non-aqueous electrolyte secondary battery has been degassed at least once.

* * * * *